US009357239B2

(12) United States Patent
Mathur et al.

(10) Patent No.: US 9,357,239 B2
(45) Date of Patent: May 31, 2016

(54) CONVERTING LIVE STREAMING CONTENT TO VIDEO-ON-DEMAND STREAMING CONTENT

(71) Applicant: Adobe Systems Incorporated, San Jose, CA (US)

(72) Inventors: Gaurang Mathur, Uttar Pradesh (IN); Pawan Kumar, Malout Punjab (IN)

(73) Assignee: Adobe Systems Incorporated, San Jose, CA (US)

( * ) Notice: Subject to any disclaimer, the term of this patent is extended or adjusted under 35 U.S.C. 154(b) by 394 days.

(21) Appl. No.: 13/679,526

(22) Filed: Nov. 16, 2012

(65) Prior Publication Data
US 2014/0143437 A1 May 22, 2014

(51) Int. Cl.
G06F 15/16 (2006.01)
H04N 21/2187 (2011.01)
H04N 21/231 (2011.01)
H04N 21/472 (2011.01)
H04N 21/658 (2011.01)
H04N 21/6587 (2011.01)
H04N 21/234 (2011.01)
H04N 21/845 (2011.01)

(52) U.S. Cl.
CPC ......... *H04N 21/2187* (2013.01); *H04N 21/231* (2013.01); *H04N 21/47202* (2013.01); *H04N 21/6581* (2013.01); *H04N 21/6587* (2013.01); *H04N 21/23424* (2013.01); *H04N 21/8456* (2013.01)

(58) Field of Classification Search
CPC ........................... H04N 21/00; H04N 21/2187
See application file for complete search history.

(56) References Cited

U.S. PATENT DOCUMENTS

| | | | |
|---|---|---|---|
| 6,414,725 B1 * | 7/2002 | Clarin et al. | 348/714 |
| 6,504,990 B1 * | 1/2003 | Abecassis | 386/283 |
| 8,695,048 B1 * | 4/2014 | Kellicker | 725/91 |
| 8,887,215 B2 * | 11/2014 | Fisher | 725/93 |
| 2002/0097984 A1 * | 7/2002 | Abecassis | 386/70 |
| 2008/0008458 A1 * | 1/2008 | Gudipaty et al. | 386/131 |
| 2008/0060001 A1 * | 3/2008 | Logan et al. | 725/34 |
| 2010/0169453 A1 * | 7/2010 | Biderman et al. | 709/217 |

(Continued)

OTHER PUBLICATIONS

3GPP technical specification 3GPP TS 26.247 v10.1.10 (2011-11) to 3GPP. ("3GPP").*
61658036 provisional.*
Http://smoothstreaming.code-shop.com/trac/wikiback, Mod-Smooth-Streaming-Live-Smooth Streaming, accessed Oct. 9, 2012. 3 pages.

(Continued)

*Primary Examiner* — June Sison
(74) *Attorney, Agent, or Firm* — Kilpatrick Townsend & Stockton LLP

(57) ABSTRACT

Systems and methods are provided for converting live streaming content or other streaming content to video-on-demand streaming content. In one embodiment, a stream conversion application receives a request to access electronic content from a target stream, such as a live stream. The request identifies the live stream. The request includes at least one time code specifying a start time for accessing electronic content in the live stream. The stream conversion application obtains the at least one time code from the request. The stream conversion application retrieves content segments from the live stream based on the at least one time code during or after publication of the live stream. The content segments include the requested electronic content from the live stream. The stream conversion application generates a video-on-demand stream by combining the content segments. The stream conversion application provides access to the video-on-demand stream.

24 Claims, 4 Drawing Sheets

(56) References Cited

U.S. PATENT DOCUMENTS

| | | | |
|---|---|---|---|
| 2010/0169459 A1* | 7/2010 | Biderman et al. | 709/219 |
| 2013/0031216 A1* | 1/2013 | Willis et al. | 709/219 |
| 2013/0067052 A1* | 3/2013 | Reynolds et al. | 709/223 |
| 2013/0091249 A1* | 4/2013 | McHugh et al. | 709/219 |
| 2013/0159388 A1* | 6/2013 | Forsman et al. | 709/203 |
| 2013/0159421 A1* | 6/2013 | Yue et al. | 709/204 |
| 2013/0179589 A1* | 7/2013 | McCarthy et al. | 709/231 |
| 2013/0198401 A1* | 8/2013 | van Doorn et al. | 709/231 |
| 2014/0040496 A1* | 2/2014 | Moorthy et al. | 709/231 |

OTHER PUBLICATIONS

Http://www.wowza.com/forums/showthread.php?12195-instant-vod-from-a-live-stream-bandwidth, Instant VOD from a Live steam-bandwidth, Feb. 10, 2011 (accessed May 27, 2015), 4 pages.

Apple Inc, HTTP Live Streaming Overview, http://developer.apple.com/library/ios/documentation/networkinginternet/conceptual/streamingmedia, accessed Oct. 10, 2012, 36 pages.

Blondin, Stephane, Overcoming the burden of VOD, Integrating 'traditional' linear television and VOD file publishing wordflows, Miranda Technologies Inc., accessed Oct. 10, 2012. 5 pages.

* cited by examiner

CONVERTING LIVE STREAMING CONTENT TO VIDEO-ON-DEMAND STREAMING CONTENT

TECHNICAL FIELD

This disclosure relates generally to computer-implemented methods and systems and more particularly relates to converting live streaming content to video-on-demand streaming content.

BACKGROUND

Online content providers can provide electronic content to computing devices via data networks such as (but not limited to) the Internet, a private intranet, or a local area network. The term "electronic content" refers to any type of media that can be displayed or played on mobile and other computing devices. Online content providers can include an entity that produces electronic content or an entity that broadcasts electronic content produced by others. Electronic content can be streamed from a server system to a client computing device. Streaming electronic content can include, for example, live and on-demand audiovisual content provided using connection-oriented or connectionless (i.e., dynamic) streaming protocols, such as (but not limited to) real time messaging protocol ("RTMP"), hypertext transfer protocol ("HTTP") dynamic streaming ("HDS"), HTTP Live Streaming ("HLS"), and Dynamic Adaptive Streaming over HTTP ("DASH") (also known as MPEG-DASH). Content providers also provide streaming electronic content depicting live events in real time.

Existing solutions for streaming electronic content include deficiencies with respect to converting live streaming content into video-on-demand streaming content. Content providers record the content of an entire live stream and store the stream to be provided as a video-on-demand stream. Recording and storing an entire live stream may inefficiently consume resources such as storage capacity and processing capacity. For example, recording an entire live stream and later extracting desired portions of a live stream can consume more processing cycles and storage capacity than extracting only the desired portions of the live stream. Recording and storing the content of an entire live stream does not allow for slicing live streaming content to generate video-on-demand streaming content. Recording and storing the content of an entire live stream also does not allow for slicing and stitching multiple streams to create a customized on-demand streaming experience.

SUMMARY

One embodiment involves a processor receiving a request to access electronic content from a live stream or other target stream. The embodiment further involves obtaining at least one time code from the request specifying a start time for accessing the requested electronic content in the live stream. The embodiment further involves the processor retrieving content segments from the live stream or other target stream based on the at least one time code during or after publication of the live stream. The content segments include the requested electronic content from the live stream or other target stream. The embodiment further involves the processor generating a video-on-demand stream by combining the content segments and/or portions thereof. The embodiment further involves the processor providing access to the video-on-demand stream. In some embodiments, providing access to the video-on-demand stream for a given streaming protocol can include generating a media orchestration file used to access the video-on-demand stream.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
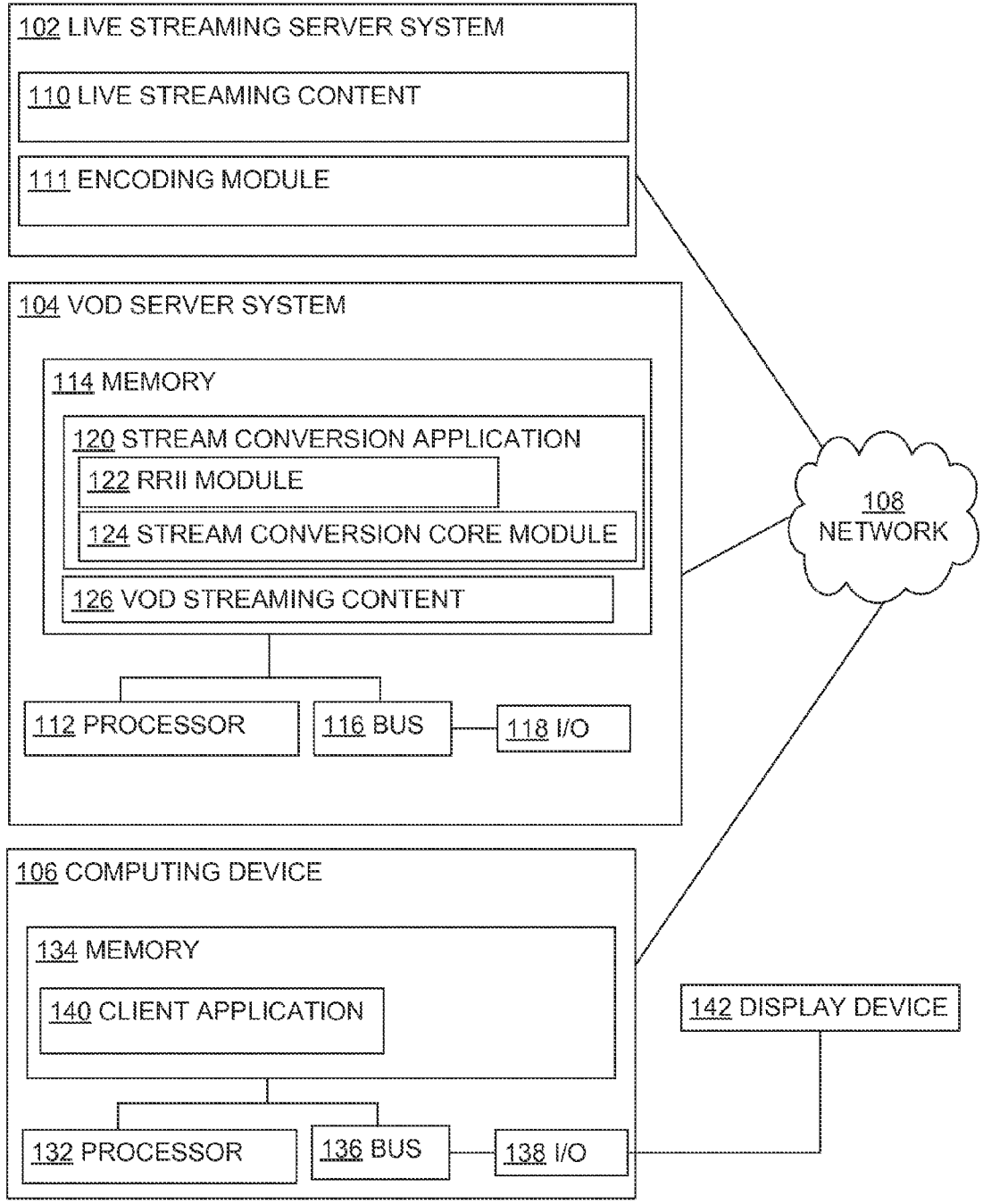
FIG. 1 is a block diagram depicting example computing systems for implementing certain embodiments.

Computer-implemented systems and methods are disclosed for converting live streaming content to video-on-demand streaming content. For example, a live stream for broadcasting Olympic events may depict different events, each of which occur during the same time period. For example, a first source for the live stream may depict a javelin throw event, a second source for the live stream may depict a badminton competition, and a third source for the live stream may depict a racing event. Although the live stream may sequentially depict excerpts from each of the events, a viewer may wish to view only the badminton competition. A stream conversion application can generate a separate video stream from different portions of the live stream that includes only streaming content for the badminton competition. The stream conversion application can generate the separate video stream by analyzing time codes embedded in the live stream and/or identifying the portions of the live stream including the badminton competition. The stream conversion application can extract portions of the live stream including the badminton competition as the live stream is being published. The stream conversion application can thereby allow a broadcaster or other content provider of the video stream to extract specific content from a live stream as the live stream is published, thereby allowing the content provider to make the extracted content available as a video-on-demand stream.

In accordance with one embodiment, a stream conversion application or other suitable application can be provided for converting live streaming content to video-on-demand streaming content. The stream conversion application can receive a request to access electronic content from a live stream. The request can specify the requested task of converting a streaming content and can include request parameters regarding the requested stream conversion process. In some embodiments, the request can be a local request that is communicated using the resources of a local computing device, such as a processor and/or data bus. In other embodiments, the request can be a remote request that is transmitted from a remote computing device through a data network, such as the Internet. The request identifies the live stream. The stream conversion application obtains at least one time code from the request specifying a start time for accessing the requested electronic content in the live stream. The parameters of request can include at least one uniform resource identifier ("URI") or uniform resource name ("URN") of the live stream and at least one time code specifying the start time code for accessing the electronic content of that live stream. In some embodiments, the request can also include a parameter identifying an end time for accessing the electronic content in the live stream. In other embodiments, the stream conversion application can subsequently receive an additional request including at least one additional time code as a request parameter that identifies an end time for accessing content in the live stream. In some embodiments, the stream conversion application can provide a response that includes at least one unique conversion process identifier that identifies the conversion process such that further requests can reference the conversion process. The response can also include a current status of the conversion process if the conversion process commences immediately after receiving the request. The stream conversion application can retrieve content segments (also known as "content slices") from the live stream based on the at least one time code during or after publication of the live stream. The content segments include the requested electronic content from the live stream. The stream conversion application can generate a video-on-demand stream by combining the content segments and/or portions thereof. The stream conversion application can provide access to the video-on-demand stream. In some embodiments, the stream conversion application provides access by generating or otherwise providing a media orchestration file that may be used by a video-on-demand protocol for accessing the video-on-demand stream.

As used herein, the term "electronic content" is used to refer to any type of media that can be rendered for display or use at a computing system or other electronic device. Electronic content can include text or multimedia files, such as images, video, audio, or any combination thereof. Electronic content can also include application software that is designed to perform one or more specific tasks at a computing system.

As used herein, the term "converting" is used to refer to extracting (or "slicing") one or more portions of one or more streams, stitching together or otherwise combining the portions from the stream(s), and generating a video-on-demand stream. In some embodiments, converting involves extracting portions from one or more live streams and combining the portions in a video-on-demand stream. In other embodiments, converting involves extracting portions from one or more video-on-demand streams and combining the portions in a customized video-on-demand stream.

As used herein, the term "live stream" is used to refer to a stream or other feed of electronic content delivered in real time over the Internet or another data network. For example, a camera or other suitable device can capture an event. An encoder can digitize the captured event to generate electronic content depicting the event. A content provider of live streaming content can publish or otherwise provide the electronic content in real time over a data network as the event occurs. Content providers can include an entity that produces electronic content or an entity that broadcasts or otherwise distributes electronic content produced by others. A non-limiting example of a live stream is a stream of electronic content provided via HTTP Dynamic Streaming ("HDS").

As used herein, the term "video-on-demand" is used to refer to systems and procedures for providing electronic content over the Internet or another data network in response to a request from a client. One example of video-on-demand content is a file that can be downloaded to a client device for playback at a later time by a client application executed at the client device. Another example of video-on-demand content is a video-on-demand stream that can be streamed to a client device for playback in real time by a client application executed at the client device.

As used herein, the term "video-on-demand ("VoD") stream" is used to refer to a stream or other feed of electronic content delivered over the Internet or another data network in response to a request from a client. A non-limiting example of a video-on-demand is a stream of electronic content provided via HDS or HLS.

As used herein, the term "client" is used to refer to an application and/or a device executing an application to access streaming content provided by a content provider.

As used herein, the term "media orchestration file" is used to refer to a file or other data identifying one or more sources from which a client can access electronic content, such as streaming media content. A media orchestration file can also describe how electronic content is to be rendered by a client application as a media presentation at the client application. Non-limiting examples of a media orchestration file include an index file, a playlist, a manifest file (such as an ".f4m" file used for HDS or an ".m3u8" used for HTTP Live Streaming ("HLS")), etc. A media orchestration file can include information such as (but not limited to) a date, time, frame numbers, segment information, and/or bootstrap information for electronic content such as a streaming video.

As used herein, the term "time code" is used to refer to a structured data format including (but not limited to) fields for time, date, user data, frames-per-second ("FPS"), etc. A time field corresponds to a clock time in an appropriate format such as (but not limited to) "HH:MM:SS:FF" format, where "FF" denotes a frame number. A date field corresponds to a calendar date in an appropriate format such as (but not limited to) "YYYY/MM/DD." A user data field can include any string such as (but not limited to) an event name. An optional FPS field can identify the FPS for the current stream.

In some embodiments, the request can be a local request provided by another application or software module executed at the same computing device as the stream conversion application. The local request can include parameters specifying a source of the live stream, a duration of the requested electronic content, and a destination for the media orchestration file. In other embodiments, the request for a stream conversion process to convert streaming electronic content is a remote request invocation interface ("RRII") request. The RRII request can be transmitted by a client application executed at a remote computing device over a data network such as (but not limited to) the Internet. The RRII request can identify the requested electronic content using time codes. The RRII request can include any or all parameters that can be included in a local request, including parameters specifying a source of the live stream, a duration of the requested electronic content, and a destination for the media orchestration file. A non-limiting example of an RRII request is a Representational State Transfer ("REST") request.

As used herein, the term "remote request invocation interface request" is used to refer to a structured format for defining a stream conversion request and parameters included in the stream conversion request. RRII can be used for communicating the stream conversion request from a remote computing device to a stream conversion application via a data network. An RRII request can be transmitted using any suitable transport protocol (e.g., TCP/IP) and/or any suitable application protocol (e.g., HTTP). An RRII request can be generated using any suitable programming language such as, but not limited to, extensible markup language ("XML"). Interfaces for transmitting and receiving RRII requests can use any suitable interface standard such as (but not limited to) REST.

As used herein, the term "Representational State Transfer" is used to refer to systems and processes used to implement application-to-application communication. A REST request can include information such as an identifier for the application requesting electronic content, one or more identifiers for the requested electronic content, a source for the requested electronic content, etc.

A non-limiting example of a time code is an SMPTE time code. An SMPTE time code is a time code for labeling individual segments of video or other electronic content, such as frames of a video. SMPTE time code can be defined by the Society of Motion Picture and Television Engineers in an SMPTE specification.

In additional or alternative embodiments, the request for a stream conversion process can include additional parameters to customize the VoD stream content. Non-limiting examples of such additional parameters include a stream segment size, bit rates, encryption parameters, a storage location for the VOD stream, etc.

In additional or alternative embodiments, the stream conversion application can wait for a relevant segment or portion of the electronic content to become available before beginning the stream conversion process. For example, a relevant segment or portion of the electronic content may become available when a content provider publishes or otherwise makes the relevant segment or portion of the electronic content accessible via a live stream over a data network, such as the Internet. The stream conversion application can determine that the content segments are available from the live stream. In one example, the stream conversion application can check the live stream at regular intervals, such as every five seconds, to determine whether a desired content segment is available from the live stream. In another example, the stream conversion application can execute an intelligent algorithm based on the latest time code of live media content to determine when the desired content segment will be available. If a desired content segment is not available from the live stream, the stream conversion application can pause or terminate the stream conversion process. The stream conversion application can retrieve the content segments in response to determining that the content segments are available. At least some of the content segments are retrieved prior to an end time for the live stream.

In additional or alternative embodiments, the stream conversion application can combine multiple content segments from the same live stream to generate a VoD stream. The request for a stream conversion process can include at least one time code specifying a start time for a first portion of the live stream, at least one time code specifying an end time for the first portion of the live stream, and at least one additional time code specifying a start time for a second portion of the live stream.

In additional or alternative embodiments, the stream conversion application can combine electronic content from multiple live streams into a single VoD stream. A request for a stream conversion process can include at least one additional identifier (e.g., an additional URI/URN) identifying at least one additional live stream and at least one additional time code specifying an additional start time for accessing content in the additional live stream. The stream conversion application can retrieve additional content segments from the additional live stream based on the at least one additional time code. The stream conversion application can retrieve the additional content segments during or after publication of the additional live stream. The stream conversion application can generate the VoD stream by combining the content segments from the live stream and the additional content segments from the additional live stream in a sequence specified as per the format of stream conversion request and using the at least one time code and the at least one additional time code. In some embodiments, the live stream and the at least one additional live stream can have different bit rates. Generating the VoD stream can include converting the bit rates for the content from the respective streams to a common bit rate for providing the VoD stream.

In additional or alternative embodiments, the source live stream(s) may have multi-bit-rate ("MBR") stream components. The stream conversion application can retrieve all of the stream components simultaneously in a multi-threading process. The stream conversion application can create a VoD stream that is a MBR stream.

In additional or alternative embodiments, the stream conversion application can retrieve at least some of the content segments from a failover source for the live stream. For example, a live stream can be provided from more than one server system. Providing the live stream from more than one server system can allow the live stream to be continuously published or otherwise provided in the event that one of the server systems experiences a failure, such as a loss of network connectivity. The stream conversion application can determine that a primary server providing the live stream has experienced a failure. In response to determining that the primary server has experienced the failure, the stream conversion application can select a failover server for retrieving the requested electronic content from the live stream.

Although the stream conversion application is described with respect to extracting content from one or more live streams, other implementations are possible. In additional or alternative embodiments, the stream conversion application can extract content from other streaming content, such as video-on-streams, during or after publication of the streaming content using time codes embedded in the streaming content. The stream conversion application can create a customized video-on-demand stream from another video-on-demand stream, multiple video-on-demand streams, or a combination of video-on-demand streams and live streams.

Referring now to the drawings, FIG. 1 is a block diagram depicting exemplary computing systems for implementing certain embodiments. The exemplary computing systems include a live streaming server system 102, a video-on-demand ("VoD") VoD server system 104, and a computing device 106 in communication via a network 108.

The live streaming server system 102 can provide live streaming content 110 to the VoD server system 104. The live streaming content 110 may be resident in any suitable computer-readable medium and execute on any suitable processor. In one embodiment, the live streaming content 110 can reside in memory at the live streaming server system 102. In another embodiment, the live streaming content 110 can be accessed by the live streaming server system 102 from a remote location via the network 108 and provided by the live streaming server system 102 to the VoD server system 104.

The live streaming server system 102 can include any suitable computing system for hosting or otherwise providing the live streaming content 110. In one embodiment, the live streaming server system 102 may be a single computing system. In another embodiment, the live streaming server system 102 may be a virtual server implemented using a number of computing systems connected in a grid or cloud computing topology.

The VoD server system 104 comprises a computer-readable medium such as a processor 112 communicatively coupled to a memory 114 that executes computer-executable program instructions and/or accesses information stored in the memory 114. The processor 112 may comprise a microprocessor, an application-specific integrated circuit ("ASIC"), a state machine, or other suitable processing device. The processor 112 can include any of a number of computer processing devices, including one. Such a processor can include or may be in communication with a computer-readable medium storing instructions that, when executed by the processor 112, cause the processor to perform the steps described herein.

A computer-readable medium may comprise, but is not limited to, electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The VoD server system 104 may also comprise a number of external or internal devices such as input or output devices. For example, the VoD server system 104 is shown with an input/output ("I/O") interface 118. A bus 116 can also be included in the VoD server system 104. The bus 116 can communicatively couple one or more components of the VoD server system 104.

FIG. 1 also illustrates a stream conversion application 120 comprised in the memory 114 of the VoD server system 104. The stream conversion application 120 stored in the memory 114 can configure the processor 112 to retrieve live streaming content 110 provided by the live streaming server system 102 via the network 108 and convert the live streaming content 110 into VoD streaming content 126. Non-limiting examples of a stream conversion application 120 include Adobe® Media Server, Apple® QuickTime Streaming Server,), RealNetworks Helix Media Server, etc. The stream conversion application 120 can include one or more modules, such as (but not limited to) a remote request invocation interface ("RRII") module 122 and a stream conversion core module 124. The RRII module 122 can configure the VoD server system 104 to analyze requests for electronic content from a computing device 106 and to execute the stream conversion core module 124 in response to receiving the requests, as described in further detail below. The stream conversion core module 124 can configure the VoD server system 104 to convert electronic content from a live stream into a VoD stream to be provided to the computing device 106, as described in further detail below.

Although FIG. 1 depicts the RRII module 122 and the stream conversion core module 124 as separate modules, the features provided by one or more of the modules can be provided by a single software module of the stream conversion application 120. Although FIG. 1 depicts the RRII module 122 and the stream conversion core module 124 as modules of the stream conversion application 120, one or more of the RRII module 122 and the stream conversion core module 124 can be separate applications accessed or otherwise used by the stream conversion application 120.

The VoD server system 104 can include any suitable computing system for hosting the stream conversion application 120. In one embodiment, the VoD server system 104 may be a single computing system. In another embodiment, the VoD server system 104 may be a virtual server implemented using a number of computing systems connected in a grid or cloud computing topology.

The computing device 106 comprises a computer-readable medium such as a processor 132 communicatively coupled to a memory 134 that executes computer-executable program instructions and/or accesses information stored in the memory 134. The processor 132 may comprise a microprocessor, an ASIC, a state machine, or other processor. The processor 132 can include any of a number of computer processing devices, including one. Such a processor can include or may be in communication with a computer-readable medium. The computer-readable medium stores instructions that when executed by the processor, cause the processor to perform the steps described herein.

The computing device 106 may also comprise a number of external or internal devices such as a mouse, a CD-ROM, DVD, a keyboard, a display, audio speakers, one or more microphones, or any other input or output devices. For example, the computing device 106 is shown with an input/output ("I/O") interface 138 and a display device 142. A bus 136 can also be included in the computing device 106. The bus 136 can communicatively couple one or more components of the computing device 106.

FIG. 1 also illustrates the client application 140 comprised in the memory 134 of the computing device 106. The client application 140 can include one or more software modules. The client application 140 can configure the processor 132 to request and receive access VoD streaming content 126 provided by the VoD server system 104 via the network 108. The client application 140 can configure the processor 132 to render some or all of the VoD streaming content 126 for display at the display device 142. For example, a client application 140 can be an internet browser application. A web session for accessing or otherwise modifying the live streaming content 110 can be established by the browser application via the network 108 between a computing device 106 and the VoD server system 104. Non-limiting examples of a client application 140 include Open Source Media Framework ("OSMF") player, a Strobe Media Player running on Adobe® Flash® Media Player, etc.

The computing device 106 can include any suitable device for communicating via a network 108 and executing the client application 140. Non-limiting examples of a computing device include a desktop computer, a tablet computer, a smart phone, or any other computing device suitable for rendering electronic content.

Although FIG. 1 depicts a client application 140 executed at a computing device 106 that is separate from the VoD server system 104, other implementations are possible. In additional or alternative embodiments, a client application 140 and a stream conversion application 120 can be executed at the same computing system or computing device. Requests for a stream conversion process can be communicated between a client application 140 or other locally executed application and the stream conversion application 120 via a bus, processor, or any other suitable mechanism for communicating data between software modules or software applications at a common computing system or common computing device.

The network 108 can include any data network suitable for communicating streaming media content. Non-limiting examples of a network 108 include the internet, a private intranet, a local area network ("LAN"), a wide area network ("WAN"), an ad hoc network, a cellular network (such as, but not limited, to a code division multiple access ("CDMA") network, a Global System for Mobile Communications ("GSM") network, or a Universal Mobile Telecommunications System ("UMTS") network), a cable network, a digital subscriber line ("DSL") network, a fiber network, a Worldwide Interoperability for Microwave Access ("WiMAX") network, or any combination of some or all of these networks.

Figure 2:
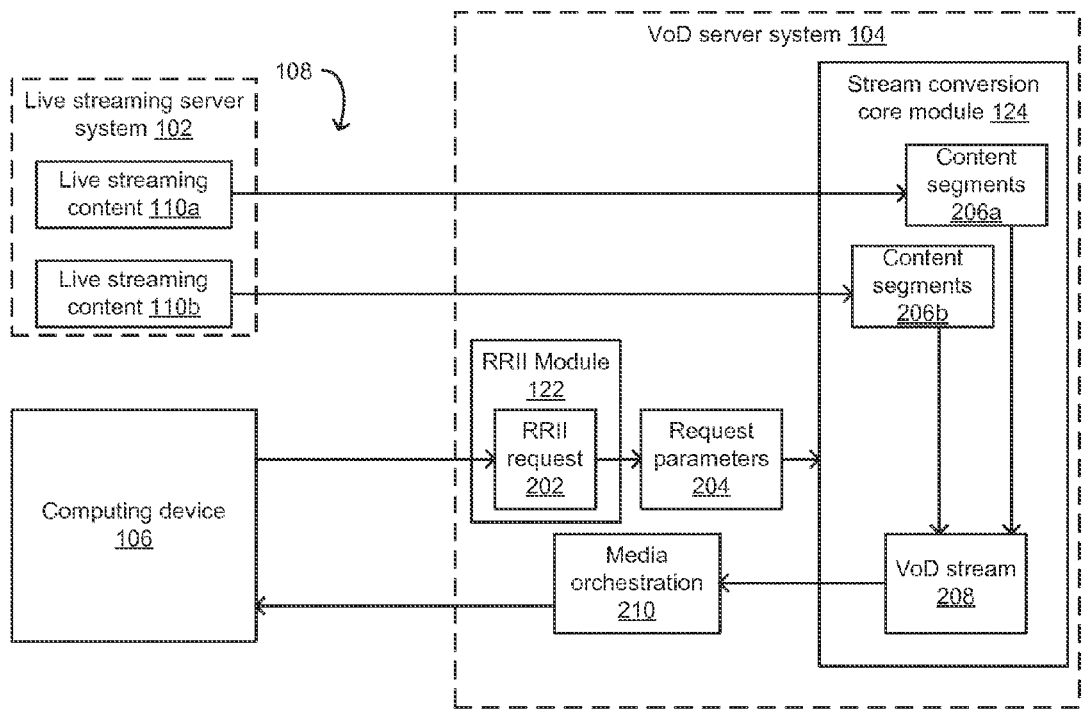
FIG. 2 is a modeling diagram illustrating an example flow of communications for converting live streaming content to video-on-demand streaming content.

FIG. 2 is a modeling diagram illustrating an example flow of communications for converting live streaming content to video-on-demand streaming content.

The live streaming server system 102 can publish or otherwise make available the live streaming content 110a, 110b. A non-limiting example of live streaming content 110 is a stream provided via HDS or HLS. The encoding module 111 can encode the segments of each of the live streaming content 110a, 110b with time codes for editing, synchronization and identification, as described in detail below. For example, an encoding module 111 can use an Action Message Format 0 ("AMF0") data packet to embed time codes in the live streaming content 110a, 110b, such as HDS streams or HLS streams. For the case of a stream provided via HLS, customized data packets (such as, but not limited to, AMF0 data packets) can be inserted in a custom data elementary stream within a transport stream. HDS streams and HLS streams can otherwise be processed in a similar manner.

A non-limiting example of a time code is an SMPTE time code. The SMPTE time code data packet or other time code message can include fields such as a time field, a date field, a user data field, and a frame-per-second field. The time field for an SMPTE time code data packet can have a format for specifying an hour, minute, second, and frame. An "hour" entry can have a two-digit value between "00" and "23." A "minute" entry can have a two-digit value between "00" and "59." A "second" entry can have a two-digit value between "00" and "59." In some embodiments, a "frame" entry can have a two-digit value between "00" and the number of frames per second under the SMPTE standard. In other embodiments for which an NTSC standard is used, a "frame" entry can have a two-digit value between "2" and the number of frames per second under the SMPTE standard for cases in which the "second" entry is zero and the "minute" entry is selected not equal to 0, 10, 20, 30, 40, or 50. The date field for an SMPTE time code data packet can identify the date in a "YYYY/MM/DD" format. The user data field for an SMPTE time code data packet can include a string specifying user data using hexadecimal characters. Each hexadecimal character can correspond to 4 bits of each user-data-group of a linear time code frame or a vertical interval time code frame of a raw data stream. The frame-per-second field for an SMPTE time code data packet can specify the frames per second for the SMPTE time code.

An SMPTE time code or other time code can be included at multiple points in live streaming content 110. An SMPTE time code or other time code can be included at one or more points in the live streaming content 110. Non-limiting examples of points at which an SMPTE time code can be inserted include (but are not limited to) the start of content identified by a group-of-pictures ("GOP") code, a point at which the date changes, a point at which user data describing the live streaming content 110 changes (e.g., a change of event), a point where the frame-per-second of the stream changes, a point at which a gap in the stream of electronic content exists, a point at which where there is some drop in the frame, or any other arbitrary location.

An SMPTE time code data packet can be an AMF0 encoded data packet or other encoded data message. The encoding module 111 can embed an AMF0 encoded data packet in live streaming content 110. In some embodiments, the encoding module 111 can calculate a time code for each access frame or data packet using a time code algorithm. For a video access frame that follows an SMPTE data packet, the time code algorithm can generate a time code from a time code for the SMPTE data packet. For example, the time code algorithm can select the value of the field SMPTE.time from a previous video frame. The time code algorithm can increment the "frame" entry. The time code algorithm can increase the value of the "frame" field by one for every video access frame encountered after an associated SMPTE data packet. The time code algorithm can set the "frame" entry to "0" and increment the "seconds" entry if the value for the frame entry is greater than a frame-per-second rate the same as that of an immediately preceding SMPTE data packet. For an audio frame access frame, SMPTE.time can be the same as that of an immediately preceding video or SMPTE data packet. For a video and audio access frame, SMPTE.date, SMPTE.userData, and SMPTE.fps can be the same as that of the previous SMPTE data packet.

Time codes can be embedded into a live stream or other stream at given intervals. A start time code included in a request for a stream conversion process can allow a stream conversion application 120 to retrieve a first available content segment and approximate at least one second segment to be retrieved as per the starting time code. The stream conversion application 120 can do so based upon the timestamp and time code include in the first time code data packet in the first available content segment. The stream conversion application 120 can retrieve one or more content segments starting with the second content segment when the second content segment becomes available. The stream conversion application 120 can calculate a respective time code value for all the media access units contained in content segments as per the algorithm described above. The stream conversion application 120 can extract all media access unit having a time code value that is greater than or equal to a start time code included in the request for the stream conversion process and less than or equal to an end time code included in the request. In additional or alternative embodiments, the stream conversion application 120 can extract all media access unit having a time code value that is greater than or equal to a start time code included in the request for the stream conversion process until an end-of-stream marker is encountered.

In additional and alternative embodiments, as time codes can include time and data fields, the stream conversion process can be also used to slice or otherwise extract content from 24×7 running live stream.

The live streaming server system 102 can provide live streams such as the live streaming content 110a, 110b. Although the live streaming server system 102 is depicted as providing two streams of live streaming content 110a, 110b, the live streaming server system 102 can provide any number of live streams depicting any number of events.

A computing device 106 can transmit a RRII request 202 to the VoD server system 104. In some embodiments, the RRII module 122 can receive more than one request simultaneously. A RRII request 202 can be, for example, an HTTP request in an extensible markup language ("XML") format. The RRII request 202 can include one or more request parameters 204 for identifying requested content segments of the live streaming content 110a, 110b. One example of a request parameter 204 is a network address for the live streaming server system 102, such as (but not limited to) a uniform resource locator. Another example of a request parameter 204 is a duration of a VoD content segment or other media fragment. Another example of a request parameter 204 is a duration of a VoD content segment or other media segment. Another example of a request parameter 204 is a start time for a content segment. Another example of a request parameter 204 is an end time for a content segment. Another example of a request parameter 204 is a network address for a combined VoD stream 208.

Although FIGS. 1-2 depict a computing device 106 separate from the VoD server system 104 that transmits a request 202 via the network 108, other implementations are possible. In additional or alternative embodiments, a client application 140 and a stream conversion application 120 can be executed at the same computing system or computing device. A request 202 generated locally by a client application 140 executed at the same computing system or computing device as the stream conversion application 120 can be communicated via a bus, processor, or any other suitable mechanism for communicating data between software modules or software applications at a common computing system or common computing device. A locally generated request 202 can include the same request parameters as a remotely generated request 202 as described above.

The RRII module 122 of the VoD server system 104 can extract the request parameters 204. The RRII module 122 can provide the request parameters 204 to the stream conversion core module 124, thereby invoking the stream conversion core module 124 to perform stream conversion. In some embodiments, the RRII module 122 can launch multiple instances of stream conversion core module 124 for multiple respective processes. Each process can include a separate stream conversion process. Each process can be executed by the processor 112. In some embodiments, a request 202 can specify a time and date in the time and date fields of a time code. The stream conversion core module 124 can match the time and date fields of the time code of the request 202 with time and date fields of time codes embedded in a live stream. The stream conversion application 120 can extract or otherwise retrieve access frames based on matching the time and date fields of the time code of the request 202 with time and date fields of time codes embedded in a live stream. In other embodiments, a request 202 can specify an event name in a user data field of a time code that can be matched with an event name specified in a user data field of time codes embedded in the live stream. The stream conversion application 120 can extract or otherwise retrieve access frames having the same value in user data fields of live stream time codes.

The RRII module 122 and/or the stream conversion core module 124 can additionally or alternatively provide additional request types and/or interfaces for performing different operations with respect to conversion processes such as (but not limited to) initiating a conversion process, stopping a conversion process, specifying an end time code, changing an end time code, retrieving the status of conversion process, etc.

In additional or alternative embodiments, a computing device 106 and/or an application executed at the same computing device or system executing the stream conversion application 120 can access the status of a stream conversion process executed by the stream conversion core module 124. The status of a stream conversion process can be accessed by transmitting or otherwise communicating an additional RRII or local request. The additional RRII or local request can include additional request parameters identifying the stream conversion process via a process identifier provided by the stream conversion core module 124 in response to the request 202. The stream conversion core module 124 can generate a status report to be provided to the computing device 106 via the network 108.

In additional or alternative embodiments, one or more of the request parameters 204 can be provided in separate stream conversion requests. For example, an end time for a content slice can be specified in an additional stream conversion request after the stream conversion core module 124 has initiated the conversion of the live streaming content 110a, 110b into the VoD stream 208 in response to the request 202 initiating a stream conversion process. Separate stream conversion requests can be RRII requests communicated by a remote computing device, such as a computing device 106, or local requests communicated by an application executed at the same computing device or computing system at which the stream conversion application is executed.

The stream conversion core module 124 can retrieve bootstrap data for live streaming content 110a, 110b provided via live streams. The bootstrap data can describe the live streaming content 110a, 110b. For example, an .f4m orchestration file in an XML format can include a bootstrap element, such as a "<bootstrap>" tag, that includes bootstrap data as per the HDS streaming protocol. In some embodiments, the stream conversion core module 124 can retrieve the bootstrap data from the live streaming server system 102 immediately upon receiving the request 202. In other embodiments, if the live streaming server system 102 has not commenced providing the live streaming content 110a, 110b, the stream conversion core module 124 can wait for a pre-determined amount of time to retrieve the bootstrap data.

The stream conversion core module 124 can retrieve content segments 206a, 206b from the live streaming content 110a, 110b. The stream conversion core module 124 can retrieve content segments 206a, 206b using the request parameters 204 extracted from the RRII request 202 or provided to the stream conversion core module 124 via a locally generated request 202. The content segments 206a, 206b include the requested electronic content from the live streaming content 110a, 110b.

To retrieve the content segments 206a, 206b, the stream conversion core module 124 can traverse each segment of the live streaming content 110a, 110b delineated by a time code data packet. The stream conversion core module 124 can extract requested video, audio, and/or data packets from each of the requested content segments 206a, 206b. The stream conversion core module 124 can extract the requested content segments 206a, 206b until a slice end time corresponding to the end time for the requested electronic content is encounted. The stream conversion core module 124 can additionally or alternatively extract the requested content segments 206a, 206b until an end time marker for the live streaming content 110 is encountered.

The stream conversion core module 124 can generate a VoD stream 208 by combining the retrieved content segments 206a, 206b and/or portions thereof. The VoD stream 208 can be, for example, an HDS stream. In some embodiments, the stream conversion core module 124 can package data packets extracted from the live streaming content 110a, 110b to generate VoD streaming content 126 such as VoD stream 208.

In some embodiments, the stream conversion core module 124 can store VoD streaming content 126 at a specified destination location, such as a memory 114 or a separate content provider server accessible by the VoD server system 104. For example, the computing device 106 can access the stored VoD streaming content 126 at a desired time other than the time of publication for the live streaming content 110. The stream conversion core module 124 can generate the VoD streaming content 126 and host the VoD streaming content 126 locally or at a remote server. Access information for the VoD streaming content 126, such as a URI or URN of a system hosting the VoD streaming content 126, can be provided in a response to a request 202 or in response to a conversion process status request.

In some embodiments, publish or otherwise provide a media orchestration file 210 for a generated VoD stream 208 to a computing device 106. A media orchestration file 210 can be provided depending upon type of video-on-demand streaming content. The computing device 106 can access the VoD stream 208 using the media orchestration file 210. The VoD stream 208 can be rendered for display at the display device 142 of the computing device 106.

Figure 3:
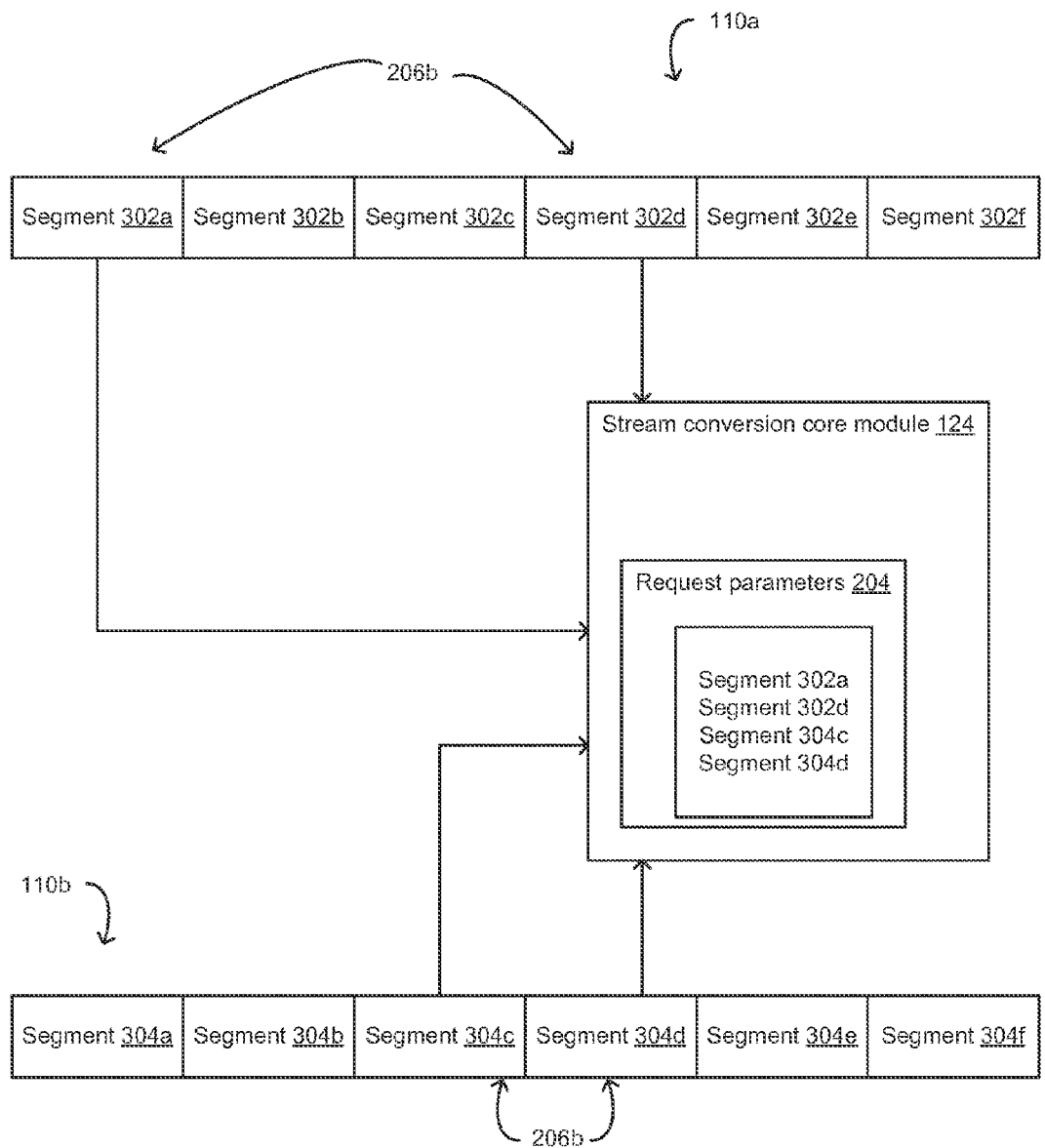
FIG. 3 is a modeling diagram depicting the retrieval of content segments of requested electronic content from live streaming content.

FIG. 3 is a modeling diagram depicting the retrieval of content segments 206a, 206b of requested electronic content from live streaming content 110a, 110b. The live streaming content 110a can include a sequence of segments 302a-f. The live streaming content 110b can include a sequence of segments 304a-f. Each of the segments 302a-f, 304a-f can be delineated by time markers described by time code data packets or other time code messages embedded in the live streaming content 110a, 110b.

The stream conversion core module 124 can retrieve content segments 206a, 206b from the live streaming content 110 using the request parameters 204. For example, as depicted in FIG. 3, the request parameters can specify that segments 302a, 302d, 304c, 304d are requested by a client computing device 106. The stream conversion core module 124 can retrieve the segments 302a, 302d, 304c, 304d simultaneously as the live streaming content 108a, 108b is published or otherwise made available by the live streaming server system 102. The stream conversion core module 124 can allow a stream conversion process to begin before an end time marker for the live streaming content 110 is encountered.

The speed of publishing the live streaming content 110 by the live streaming server system 102 may be slower than the conversion speed of the stream conversion core module 124. In some embodiments, the stream conversion core module 124 can wait for the live streaming content 110a, 110b to reach a specified start time. The stream conversion core module 124 can retrieve requested electronic content from the live streaming content 110a, 110b as the respective segments 302a, 302d, 304c, and 304d are published or otherwise made available by the live streaming server system 102.

In additional or alternative embodiments, the stream conversion core module 124 can configure the processor 112 to execute a respective process for each of multiple live streams. Executing a respective process for each of multiple live streams can allow the stream conversion core module 124 to account for different bit rates between different live streams to be combined or for live streaming content provided using multiple bit rate ("MBR") streaming.

In one example, the stream conversion core module 124 can slice MBR streams and create a corresponding MBR VoD stream 208. An encoding module 111 of the live streaming server system 102 can provide multiple renditions of live streaming content 110. Each rendition can be a version of the live streaming content 110 encoded at a different bit rate. For example, a rendition encoded at a higher bit rate may be suitable for high-speed network connections between a client device and a content provider and a rendition encoded at a lower bit rate may be suitable for low-speed network connections between the client device and the content provider. The stream conversion application 120 can generate a VoD stream 208 that includes multiple renditions encoded at different bit rates. The computing device 106 can select different renditions of the VoD stream 208 in order to minimize interruptions in the rendering or other use of the VoD stream 208 at the computing device 106. The stream conversion core module 124 can configure the processor 112 to execute a respective process for converting each rendition of the requested content from the live streaming content 110. Executing a respective process for each rendition can allow for independent conversion of each rendition.

In another example, the live streaming content 110a can have a first bit rate that is different from a bit rate for the live streaming content 110b. Executing a respective process for each live stream respectively providing in the live streaming content 110a, 110b can allow for independent conversion of each live stream.

In additional or alternative embodiments, the stream conversion core module 124 can calculate a start timestamp, compute a segment number for the timestamp, and retrieve the fragment of media content. The stream conversion core module 124 can calculate the timestamp based on bootstrap information for the live streams and time code data packets to calculate a time code for each media access frame. The stream conversion core module 124 can retrieve the requested segments that contain time code data packets or other time code messages identifying a time marker greater than the time code specified as a conversion start time. For example, if a segment 302a of the live streaming content 110a is being published, future segments 302b-f are not available. The stream conversion core module 124 module can switch to a waiting mode in which the stream conversion process is paused if the specified start time code is greater than the time code found in the available content segments. The stream conversion core module 124 can resume a stream conversion process to retrieve the requested segments upon detecting that a time marker for one of the segments 302b-f has a time code greater than a stream conversion process start time.

In some embodiments, the stream conversion core module 124 can retrieve content from the live streaming content 110 using failover-handling technology. For example, a live streaming server system 102 can include multiple servers for providing the live streaming content 110a, 110b. Providing the live stream from more than one server can allow the live stream to be continuously published or otherwise provided in the event that one of the servers experiences a failure, such as a loss of network connectivity. The stream conversion application 120 can determine that a primary server of the live streaming server system 102 has experienced a failure. In response to determining that the primary server has experienced the failure, the stream conversion application 120 can select a failover server of the live streaming server system 102 for retrieving the content segments 206a, 206b.

Although FIGS. 1-3 depict extracting content from live streaming content 110a, 110b to generate a VoD stream 208, other implementations are possible. In additional or alternative embodiments, the stream conversion application 120 can extract content from one or more target streams, such as another video-on-demand stream, multiple video-on-demand streams, or a combination of video-on-demand streams and live streams. The stream conversion application 120 can create a customized video-on-demand stream from the one or more target streams using the same or similar processes described in FIGS. 2-3 above with respect to the live streaming content 110a, 110b.

Figure 4:
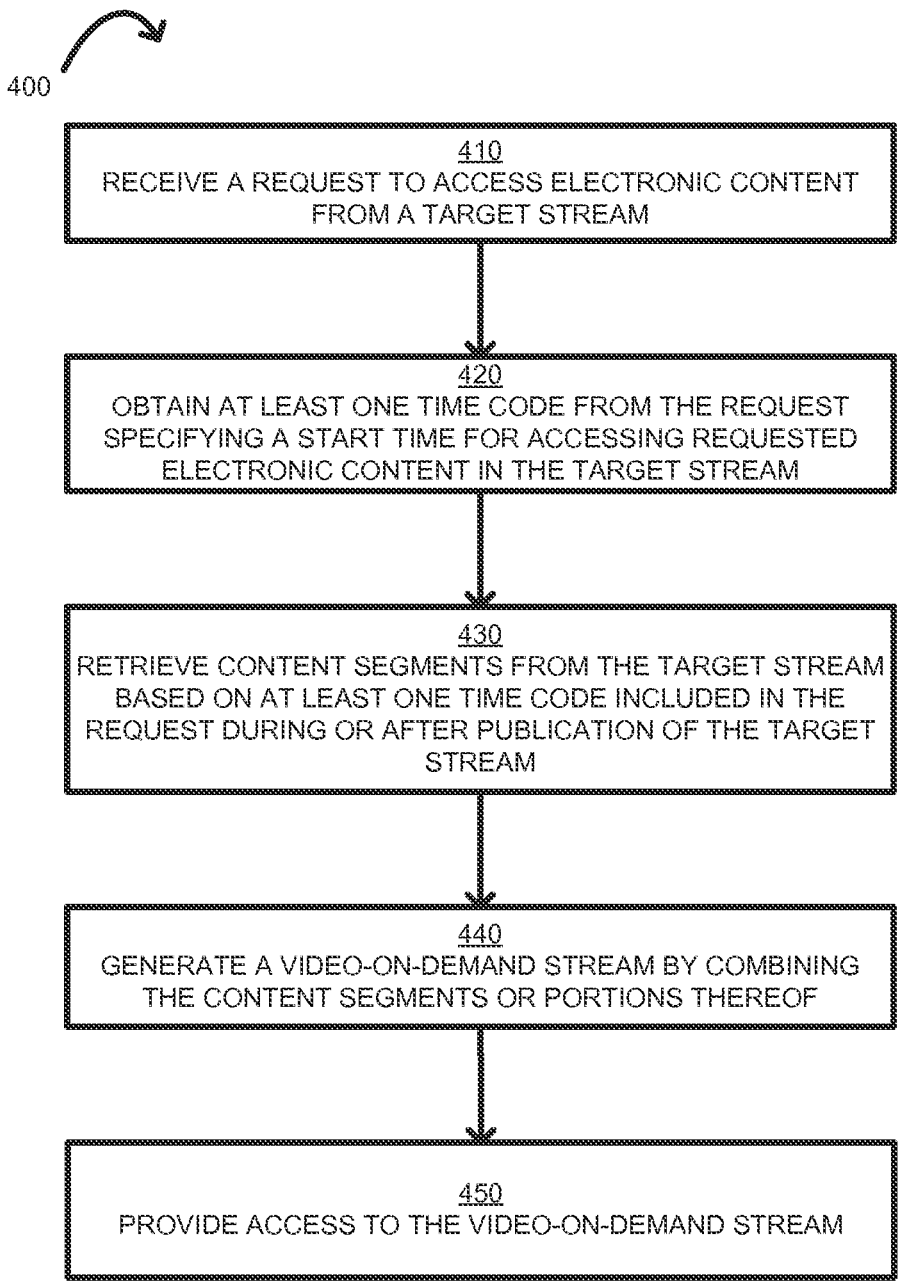
FIG. 4 is a flow chart illustrating an example method for converting live streaming content to video-on-demand streaming content.

The stream conversion application 120 can be executed at the VoD server system 104 by the processor 112 to convert live streaming content 110 to a VoD streaming content. FIG. 4 is a flow chart illustrating an example method 400 for converting live streaming content to video-on-demand streaming content. For illustrative purposes, the method 400 is described with reference to the system implementations depicted in FIG. 1. Other implementations, however, are possible.

The method 400 involves receiving a request to access electronic content from a live stream or other target stream, as shown in block 410. For example, a computing device 106 can provide a request 202 to a VoD server system 104 to access live streaming content 110a and/or live streaming content 110b. The processor 112 of the VoD server system 104 can execute the RRII module 122 to receive the request 202. The request 202 can identify the live streaming content 110a and/or live streaming content 110b. The request 202 can additionally or alternatively include request parameters identifying the live streaming server system 102 as a source of the live streaming content 110a, 110b, a duration of the requested electronic content corresponding to the content segments 206a, 206b, and a destination for a media orchestration file 210.

The method 400 further involves obtaining at least one time code from the request that specifies a start time for accessing the requested electronic content in the live stream or other target stream, as shown in block 420. The processor 112 of the VoD server system 104 can execute the RRII module 122 to receive a request 202 from a remote computing device, such as a computing device 106, or from another application executed at the computing system in which the processor 112 is included.

In some embodiments, the request 202 can include at least one time code specifying a start time for accessing electronic content in the live stream. For example, the request 202 can include SMPTE time codes identifying content segments 206a, 206b.

The RRII module 122 can configure the processor 112 to execute the stream conversion core module 124 in response to the RRII module receiving the request 202. In some embodiments, the RRII module 122 can provide time code(s) from the request 202 to the stream conversion core module 124. In other embodiments, the RRII module 122 can provide the request 202 including request parameters 204 to the stream conversion core module 124.

The method 400 further involves retrieving content segments from the live stream based on the at least one time code included in the request during or after publication of the live stream or other target stream, as shown in block 430. The processor 112 of the VoD server system 104 can execute the stream conversion core module 124 to retrieve content segments, such as content segments 206a, 206b of live streaming content 110a, 110b. In some embodiments, retrieving the content segments 206a, 206b includes slicing each content segment using one or more time markers specified by one or more respective time codes.

In additional or alternative embodiments, the stream conversion core module 124 can determine whether the content segments 206a, 206b are available from the live streaming content 110a, 110b. The stream conversion core module 124 retrieves the content segments 206a, 206b in response to determining that the content segments 206a, 206b are available. At least some of the content segments 206a, 206b are retrieved prior to an end time for the live streaming content 110a, 110b.

The method 400 further involves generating a VoD stream 208 by combining the content segments 206a, 206b and/or portions thereof, as shown in block 440. The processor 112 of the VoD server system 104 can execute the stream conversion core module 124 to combine the content segments 206a, 206b into the VoD stream 208, as described above with respect to FIGS. 2 and 3.

The method 400 further involves providing access to the VoD stream 208, as shown in block 450. The processor 112 of the VoD server system 104 can execute the stream conversion core module 124 to provide access to the VoD stream 208.

In some embodiments, the stream conversion core module 124 can provide access to the VoD stream 208 by generating and/or otherwise providing a media orchestration file 210 for accessing the VoD stream 208. The stream conversion core module 124 can generate and/or otherwise provide the media orchestration file 210 as specified in the protocol of for the destination VoD stream 208. The processor 112 can provide the media orchestration file 210 to a client, such as the computing device 106, via the network 108. The media orchestration file 210 can identify a source from which a client, such as the computing device 106, can access the VoD stream 208. For example, the VoD stream 208 may be stored at a content server separate from the VoD server system 104. A media orchestration file 210 can include a network address or other identifier that the computing device 106 can use to access the VoD stream 208. Non-limiting examples of a media orchestration file include an index file, a manifest, a playlist, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps.

Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
receiving, by a processor, a request to generate a video-on-demand stream from electronic content that is accessible from a live stream, wherein the request is received prior to requested electronic content being published via the live stream, wherein the live stream comprises a stream or other feed of electronic content delivered in real time over a data network;
obtaining, by the processor, at least one time code from the request specifying a start time for accessing the requested electronic content in the live stream;
generating, by the processor, the video-on-demand stream from the live stream by performing operations comprising:
retrieving, based on the at least one time code obtained from the request, a plurality of content segments from the published live stream, the plurality of content segments comprising the requested electronic content from the live stream, wherein retrieving the plurality of content segments comprises retrieving the first content segment, omitting a second content segment published in the live stream after the first content segment, and retrieving a third segment that is published in the live stream after the second content segment and that is non-contiguous with the first content segment, and combining the retrieved plurality of content segments into the video-on-demand stream; and
providing, by the processor, access to the video-on-demand stream.

2. The method of claim 1, wherein the request comprises a remote request invocation interface request and the at least one time code comprises at least one SMPTE time code; and
wherein retrieving the plurality of content segments comprises slicing each content segment using a time marker specified by the at least one SMPTE time code.

3. The method of claim 1, wherein the request comprises at least one request parameter specifying a source of the live stream, a duration of the requested electronic content, and a destination for the video-on-demand stream.

4. The method of claim 1, further comprising providing a status for generating the video-on-demand stream in response to receiving an additional request.

5. The method of claim 1, further comprising determining that the content segments are available from the live stream and retrieving the content segments in response to determining that the content segments are available, wherein at least some of the content segments are retrieved prior to an end time for the live stream.

6. The method of claim 1, wherein the request further comprises a plurality of pairs of start time codes and end time codes, each of the plurality of pairs of start time codes and end time codes identifying a respective portion of the live stream.

7. The method of claim 1, wherein the request also identifies a target stream in addition to the live stream and at least one additional time code for accessing content in the target stream, and further comprising:
retrieving, during or after publication of the target stream, a plurality of additional content segments from the target stream based on the at least one additional time code,
wherein generating the video-on-demand stream comprises combining the plurality of content segments and the plurality of additional content segments in a sequence specified by the at least one time code and the at least one additional time code.

8. The method of claim 7, wherein the live stream has a bit rate and the target stream has at least one additional bit rate different from the bit rate for the live stream and wherein generating the video-on-demand stream further comprises converting the bit rate and the at least one additional bit rate to a common bit rate for providing the video-on-demand stream.

9. The method of claim 1, further comprising receiving an additional request comprising at least one additional time code identifying an end time for accessing content in the live stream.

10. The method of claim 1, wherein retrieving the plurality of content segments further comprises:
determining, after retrieving a first subset of content segments from the plurality of content segments, that a source from which the first subset of content segments was retrieved has experienced a failure;
identifying a failover source for the live stream in response to determining that the source has experienced the failure; and
retrieving a second subset of content segments from the plurality of content segments from the failover source for the live stream.

11. The method of claim 1, wherein providing access to the video-on-demand stream comprises providing a media orchestration file for accessing the video-on-demand stream.

12. A non-transitory computer-readable medium embodying program code executable by a processing device, the non-transitory computer-readable medium comprising:
program code for receiving a request to generate a video-on-demand stream from electronic content that is accessible from a live stream, wherein the request is received prior to requested electronic content being published via the live stream;
program code for obtaining at least one time code from the request specifying a start time for accessing the requested electronic content in the live stream;
program code for generating the video-on-demand stream from the live stream by performing operations comprising:
retrieving, based on the at least one time code obtained from the request, a plurality of content segments from the published live stream, the plurality of content segments comprising the requested electronic content from the live stream, wherein retrieving the plurality of content segments comprises retrieving the first content segment, omitting a second content segment published in the live stream after the first content segment, and retrieving a third segment that is published in the live stream after the second content segment and that is non-contiguous with the first content segment, and;

combining the retrieved plurality of content segments into the video-on-demand stream; and program code for providing access to the video-on-demand stream.

13. The non-transitory computer-readable medium of claim 12,
wherein the request comprises a remote request invocation interface request and the at least one time code comprises at least one SMPTE time code; and
wherein retrieving the plurality of content segments comprises slicing each content segment using a time marker specified by the at least one SMPTE time code.

14. The non-transitory computer-readable medium of claim 12, wherein the request comprises at least one request parameter specifying a source of the live stream, a duration of the requested electronic content, and a destination for the video-on-demand stream.

15. The non-transitory computer-readable medium of claim 12, further comprising program code for determining that the content segments are available from the live stream and retrieving the content segments in response to determining that the content segments are available, wherein at least some of the content segments are retrieved prior to an end time for the live stream.

16. The non-transitory computer-readable medium of claim 12, wherein the request also identifies at least one additional live stream and at least one additional time code for accessing content in the at least one additional live stream, and further comprising:
program code for retrieving, during or after publication of the at least one additional live stream, a plurality of additional content segments from the at least one additional live stream based on the at least one additional time code,
wherein generating the video-on-demand stream comprises combining the plurality of content segments and the plurality of additional content segments in a sequence specified by the at least one time code and the at least one additional time code.

17. A system comprising:
a processor configured to execute instructions stored in a non-transitory computer-readable medium and thereby perform operations comprising;
receiving a request to generate a video-on-demand stream from electronic content that is accessible from a live stream, wherein the request is received prior to requested electronic content being published via the live stream;
obtaining at least one time code from the request specifying a start time for accessing the requested electronic content in the live stream;
generating the video-on-demand stream from the live stream by performing operations comprising:
retrieving, based on the at least one time code obtained from the request, a plurality of content segments from the published live stream, the plurality of content segments comprising the requested electronic content from the live stream, wherein retrieving the plurality of content segments comprises retrieving the first content segment,
omitting a second content segment published in the live stream after the first content segment, and retrieving a third segment that is published in the live stream after the second content segment and that is non-contiguous with the first content segment, and
combining the retrieved plurality of content segments into the video-on-demand stream; and
providing access to the video-on-demand stream.

18. The system of claim 17, wherein the operations further comprise embedding one or more time code data packets in the live stream.

19. The system of claim 18, wherein the request comprises a remote request invocation interface request and the at least one time code comprises at least one SMPTE time code and wherein the operations further comprise retrieving the plurality of content segments by slicing each content segment using a time marker specified by the at least one SMPTE time code.

20. The system of claim 17, wherein the operations further comprise determining that the content segments are available from the live stream and retrieving the content segments in response to determining that the content segments are available, wherein at least some of the content segments are retrieved prior to an end time for the live stream.

21. The method of claim 1, wherein generating the video-on-demand stream further comprises:
determining, during a first interval subsequent to obtaining the at least one time code, that the live stream lacks a first content segment corresponding to the at least one time code; and
determining, during a second interval subsequent to the first interval, that the live stream includes the first content segment corresponding to the at least one time code,
wherein the plurality of content segments is retrieved based on determining from the at least one time code that the published live stream includes the first content segment in the second interval.

22. The method of claim 21, wherein the plurality of content segments are retrieved in response to receiving the request to access the electronic content and are retrieved simultaneously with the publication of the plurality of content segments in the live stream.

23. The method of claim 22, wherein generating the video-on-demand stream comprises packaging the retrieved plurality of content segments so that the combined plurality of content segments are in a common format for streaming and are stored in a common location.

24. The method of claim 1, further comprising:
determining that a plurality of renditions of the live stream having different bit rates are available, wherein the plurality of content segments are retrieved from each rendition of the live stream, wherein generating the video-on-demand stream comprises combining each rendition of the retrieved plurality of content segments into a separate rendition of the video-on-demand stream.

* * * * *